United States Patent
Moniz et al.

(10) Patent No.: US 10,677,264 B2
(45) Date of Patent: Jun. 9, 2020

(54) SUPERSONIC SINGLE-STAGE TURBOFAN ENGINE

(71) Applicant: General Electric Company, Schenectady, NY (US)

(72) Inventors: Thomas Ory Moniz, Loveland, OH (US); Daniel Robert Dwyer, West Chester, OH (US); Mark John Laricchiuta, West Chester, OH (US); Jeffrey Donald Clements, Mason, OH (US); Brandon Wayne Miller, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 512 days.

(21) Appl. No.: 15/293,368

(22) Filed: Oct. 14, 2016

(65) Prior Publication Data

US 2018/0106274 A1     Apr. 19, 2018

(51) Int. Cl.
*F04D 29/66*     (2006.01)
*F04D 29/32*     (2006.01)
(Continued)

(52) U.S. Cl.
CPC ........... *F04D 29/663* (2013.01); *F01D 9/041* (2013.01); *F02C 3/04* (2013.01); *F02K 3/06* (2013.01);
(Continued)

(58) Field of Classification Search
CPC ... F01D 9/041; F01D 5/22; F01D 5/10; F01D 25/04; F02C 3/04; F02C 3/06;
(Continued)

(56) References Cited

U.S. PATENT DOCUMENTS

| 3,505,819 A | 4/1970 | Wilde |
| 4,183,211 A | 1/1980 | Menioux |

(Continued)

FOREIGN PATENT DOCUMENTS

| CA | 2613783 A1 | 6/2008 |
| CN | 1900508 A | 1/2007 |

(Continued)

OTHER PUBLICATIONS

Effect of Rotor-To-Stator Spacing on Acoustic Performance of a Full-Scale Fan for Turbofan Engines, NASA, pp. 1-3, 19, 25 (Year: 1974).*

(Continued)

*Primary Examiner* — Carlos A Rivera
(74) *Attorney, Agent, or Firm* — Dority & Manning, P.A.

(57) ABSTRACT

A gas turbine engine includes a fan section having a single-stage fan, a core turbine engine, and a nacelle at least partially surrounding the fan of the fan section and the core turbine engine. The gas turbine engine also includes an outlet guide vane extending between a casing of the core turbine engine and the nacelle. The gas turbine engine is configured to define an acoustic ratio greater than or equal to 2.3, with the acoustic ratio being a ratio of an axial spacing between the trailing edge of the fan blade and the leading edge of the outlet guide vane at a radial location seventy-five percent (75%) along the span of the fan blade to the axial width of the fan blade also at the radial location seventy-five percent (75%) along the span of the fan blade.

20 Claims, 3 Drawing Sheets

(51) Int. Cl.
  *F01D 9/04* (2006.01)
  *F04D 29/54* (2006.01)
  *F02C 3/04* (2006.01)
  *F02K 3/06* (2006.01)
  *F04D 29/38* (2006.01)
  *F04D 29/52* (2006.01)

(52) U.S. Cl.
  CPC ......... *F04D 29/324* (2013.01); *F04D 29/325* (2013.01); *F04D 29/384* (2013.01); *F04D 29/522* (2013.01); *F04D 29/542* (2013.01); *F04D 29/665* (2013.01); *F05D 2220/36* (2013.01); *F05D 2220/80* (2013.01); *F05D 2260/961* (2013.01); *Y02T 50/673* (2013.01)

(58) Field of Classification Search
  CPC .... F04D 29/663; F04D 29/665; F04D 29/384; F04D 29/242; F05D 2260/961; F02K 3/06
  See application file for complete search history.

(56) References Cited

U.S. PATENT DOCUMENTS

| | | | |
|---|---|---|---|
| 5,169,288 A * | 12/1992 | Gliebe | F02C 7/045 415/119 |
| 5,184,459 A | 2/1993 | McAndrews | |
| 5,478,199 A * | 12/1995 | Gliebe | B64D 33/02 415/119 |
| 6,554,564 B1 * | 4/2003 | Lord | F01D 5/141 415/119 |
| 7,513,102 B2 | 4/2009 | Moniz et al. | |
| 8,082,727 B2 | 12/2011 | Roberge | |
| 9,109,453 B2 | 8/2015 | Spangler et al. | |
| 2002/0174540 A1 | 11/2002 | Milburn | |
| 2006/0228206 A1 | 10/2006 | Decker et al. | |
| 2008/0148564 A1 * | 6/2008 | Burton | F01D 5/141 29/888.02 |
| 2008/0148708 A1 | 6/2008 | Chou et al. | |
| 2008/0226454 A1 | 9/2008 | Decker et al. | |
| 2009/0152764 A1 | 6/2009 | Xie et al. | |
| 2011/0047960 A1 | 3/2011 | Huber et al. | |
| 2011/0167784 A1 | 7/2011 | Johnson et al. | |
| 2012/0199670 A1 * | 8/2012 | Jardine | F02K 1/06 239/265.19 |
| 2012/0201686 A1 | 8/2012 | Fromentin et al. | |
| 2016/0010589 A1 | 1/2016 | Rolt | |
| 2018/0094582 A1 * | 4/2018 | Rosenau | F02C 7/045 |

FOREIGN PATENT DOCUMENTS

| | | |
|---|---|---|
| CN | 101021181 A | 8/2007 |
| CN | 102105670 A | 6/2011 |
| CN | 104040117 A | 9/2014 |
| WO | WO2014007961 A1 | 1/2014 |

OTHER PUBLICATIONS

Noise Studies of Inlet-Guide-Vane-Rotor Interaction of a Single-Stage Axial-Flow Compressor, NASA (Year: 1965).*
Effects of Vane/Blade Ratio and Spacing on Fan Noise, AIAA 7th Aeroacoustics Conference (Year: 1981).*
Chinese Office Action Corresponding to CN Application No. 201710957913.6 dated Jun. 14, 2019.

* cited by examiner

US 10,677,264 B2

SUPERSONIC SINGLE-STAGE TURBOFAN ENGINE

FIELD OF THE INVENTION

The present subject matter relates generally to a gas turbine engine, or more particularly to a gas turbine engine having a relatively high acoustic ratio.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. At least certain gas turbine engines further include a nacelle extending around and surrounding at least a portion of the fan and the core. The nacelle may be supported by, and mechanically coupled to, the core and/or fan by a plurality of struts. For gas turbine engines including a single stage fan, the struts are positioned in relatively close proximity to the fan blades, such that they may act as outlet guide vanes for the fan.

For gas turbine engines operating at supersonic flight speeds, i.e., flight speeds greater than Mach 1, the fan typically includes a plurality of fan stages to define a relatively high overall fan pressure ratio. However, these gas turbine engines may generate a relatively large amount of acoustic disturbance (i.e., noise) when operating at supersonic flight speeds. While this is generally acceptable for military applications, this acoustic disturbance may limit the gas turbine engine's use for commercial applications given noise limit restrictions for commercial aircraft over land.

Accordingly, a gas turbine engine capable of operating at supersonic flight speeds while generating less acoustic disturbance during operation would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, the gas turbine engine defining an axial direction and a radial direction is provided. The gas turbine engine includes a fan section including a single-stage fan having a fan blade. The fan blade defines a span, an axial width along the axial direction, and a trailing edge. The gas turbine engine also includes a core turbine engine including a casing. The gas turbine engine also includes a nacelle at least partially surrounding the fan of the fan section and the core turbine engine. The gas turbine engine also includes an outlet guide vane extending between the casing of the core turbine engine and the nacelle and defining a leading edge. An acoustic ratio of the gas turbine engine is greater than or equal to 2.3. The acoustic ratio is a ratio of an axial spacing between the trailing edge of the fan blade and the leading edge of the outlet guide vane at a radial location seventy-five percent (75%) along the span of the fan blade to the axial width of the fan blade also at the radial location seventy-five percent (75%) along the span of the fan blade.

In one exemplary aspect of the present disclosure, a method for operating a gas turbine engine is provided. The gas turbine engine includes a single-stage fan including a fan blade, a core turbine engine including a casing, a nacelle, and an outlet guide vane extending between the casing of the core turbine engine and the nacelle. The method includes operating the gas turbine engine at subsonic flight speeds. The method also includes operating the gas turbine engine at supersonic flight speeds, with the gas turbine engine defining an acoustic ratio greater than or equal to 2.3. The acoustic ratio is a ratio of an axial spacing between the trailing edge of the fan blade and the leading edge of the outlet guide vane at a radial location seventy-five percent (75%) along the span of the fan blade to the axial width of the fan blade also at the radial location seventy-five percent (75%) along the span of the fan blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
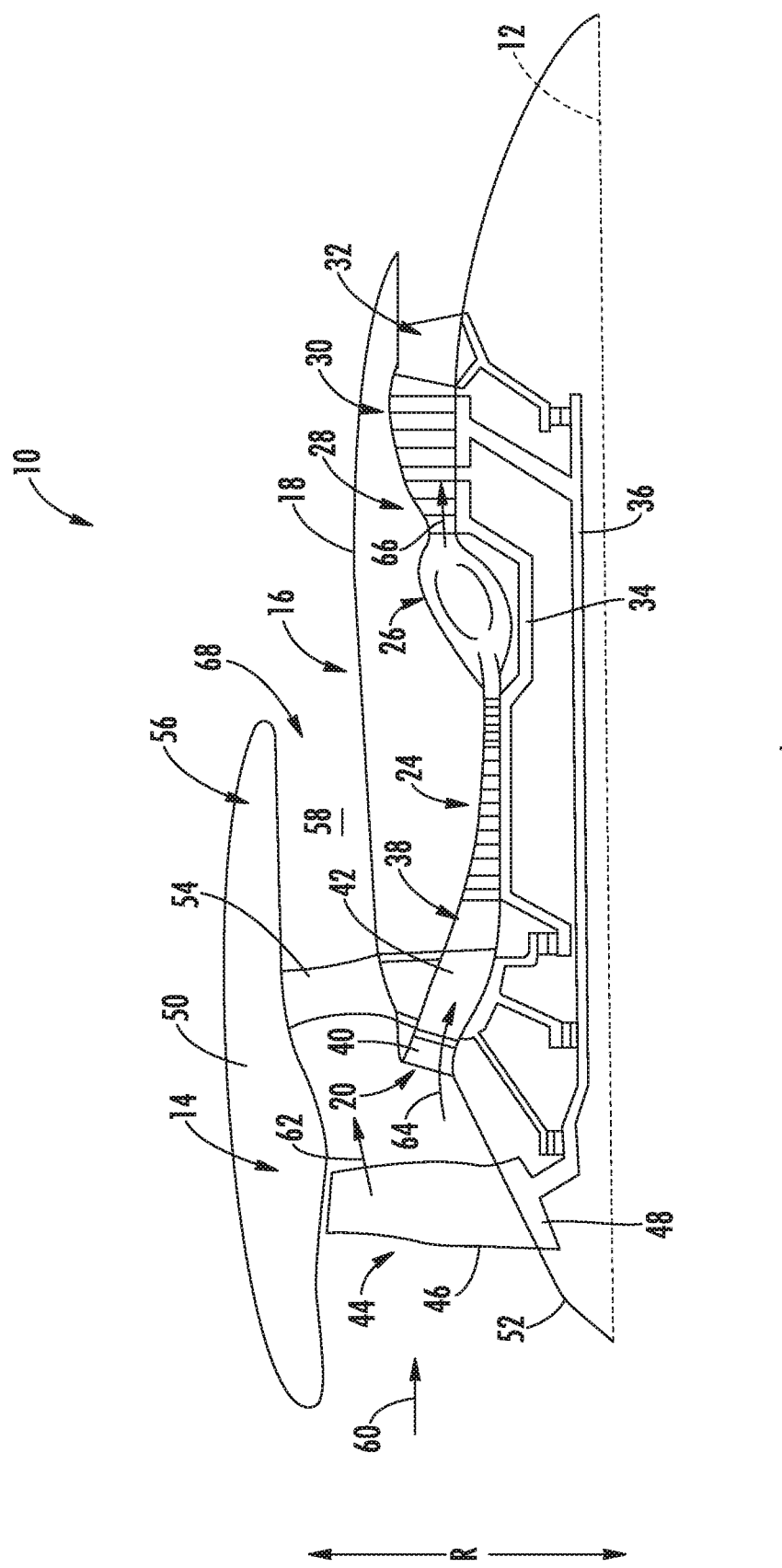
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 3:
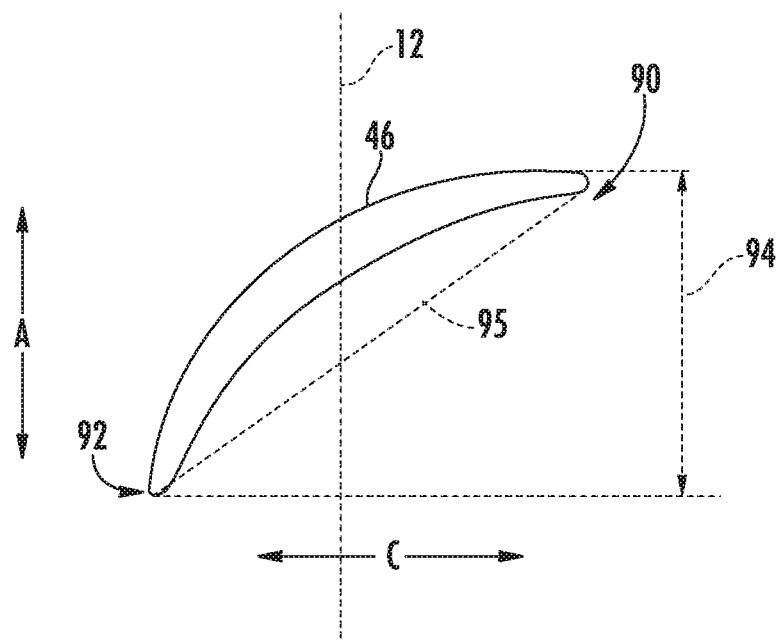
FIG. 3 is a close-up, radial top view of a fan blade of a fan of the fan section depicted in FIG. 2.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 3). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a single compressor, which may be referred to as a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the fan section 14.

The compressor section (including the compressor 24), combustion section 26, turbine section (including the turbines 28, 30), and jet exhaust nozzle section 32 together define a core air flowpath 38 through the core turbine engine 16. Notably, for the embodiment depicted, the core turbine engine 16 further includes a stage of inlet guide vanes 40 at a forward end of the core air flowpath 38, as well as a plurality of struts 42 extending through the core air flowpath 38 at a location forward of the HP compressor 24. The plurality of struts 42 may provide structural support for the core turbine engine 16.

For the embodiment depicted, the fan section 14 includes a fixed-pitch fan 44 having a plurality of fan blades 46 coupled to a disk 48 in a spaced apart manner. More specifically, for the embodiment depicted, the fan 44 is a single stage fan, i.e., a fan having a single stage of fan blades 46. As depicted, the fan blades 46 extend outwardly from the disk 48 generally along the radial direction R. The fan blades 46 and disk 48 are together rotatable about the longitudinal axis 12 by LP shaft 36. Additionally, the exemplary turbofan engine 10 depicted is configured as a direct drive turbofan engine. More specifically, the exemplary turbofan 10 depicted does not include a reduction gearbox, or power gearbox, between the LP shaft 36 and the fan section 14, and instead, the LP shaft 36 is directly mechanically connected to the fan 44 of the fan section 14.

During operation of the turbofan engine 10, the fan 44 of the turbofan engine 10 defines a fan pressure ratio. The fan pressure ratio refers to a ratio of a pressure immediately upstream of the plurality of fan blades 46 to a pressure immediately downstream of the plurality of fan blades 46 during operation of the fan 44 at a rated speed. For the embodiment depicted, the fan 44 of the turbofan engine 10 defines a fan pressure ratio greater than 1.8. For example, in certain exemplary embodiments, the fan pressure ratio may be greater than or equal to 1.9, or 2.0, and less than or equal to 4.0.

Referring still to the exemplary embodiment of FIG. 1, the disk 48 is covered by rotatable front hub 52 aerodynamically contoured to promote an airflow through the plurality of fan blades 46. Additionally, the exemplary fan section 14 includes an annular fan casing or outer nacelle 50 that circumferentially surrounds the fan 44 and/or at least a portion of the core turbine engine 16. The exemplary nacelle 50 depicted is supported relative to the core turbine engine 16 by a plurality of circumferentially-spaced outlet guide vanes 54. Moreover, a downstream section 56 of the nacelle 50 extends over an outer portion of the core turbine engine 16 so as to define a bypass airflow passage 58 therebetween.

During operation of the turbofan engine 10, a volume of air 60 enters the turbofan 10 through the nacelle 50 and/or fan section 14. As the volume of air 60 passes across the fan blades 46, a first portion of the air 60, as indicated by arrows 62, is directed or routed into the bypass airflow passage 58 and a second portion of the air 60, as indicated by arrow 64, is directed or routed into the core air flowpath 38, and more specifically, into the inlet 20 defined by the core turbine engine 16 to the core air flowpath 38. The ratio between the first portion of air 62 and the second portion of air 64 is commonly known as a bypass ratio. The pressure of the second portion of air 64 is increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes (not labeled) that are coupled to the outer casing 18 and HP turbine rotor blades (not labeled) that are coupled to the HP shaft 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes (not labeled) that are coupled to the outer casing 18 and LP turbine rotor blades (not labeled) that are coupled to the LP shaft 36, thus causing the LP shaft 36 to rotate, thereby supporting operation of the fan 44.

The combustion gases 66 are subsequently routed through the jet exhaust nozzle section 32 of the core turbine engine 16 to provide propulsive thrust. Simultaneously, a pressure of the first portion of air 62 is substantially increased as the first portion of air 62 is routed through the bypass airflow passage 58 before it is exhausted from a fan nozzle exhaust section 68 of the turbofan 10, also providing propulsive thrust.

Further, for the embodiment depicted, the turbofan engine 10 is configured as a supersonic turbofan engine 10 configured to operate at flight speeds greater than Mach 1. Such may be accomplished due to the various design parameters of the turbofan engine 10, such as the single-stage fan 44 and booster-less compressor section (i.e., the compressor section including a single, HP compressor 24). Additionally, other design parameters, such as a fan pressure ratio, a bypass ratio, a fan diameter, an overall pressure ratio, etc., have been considered.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may include any other suitable number of compressors, turbines, and/or spools.

Figure 2:
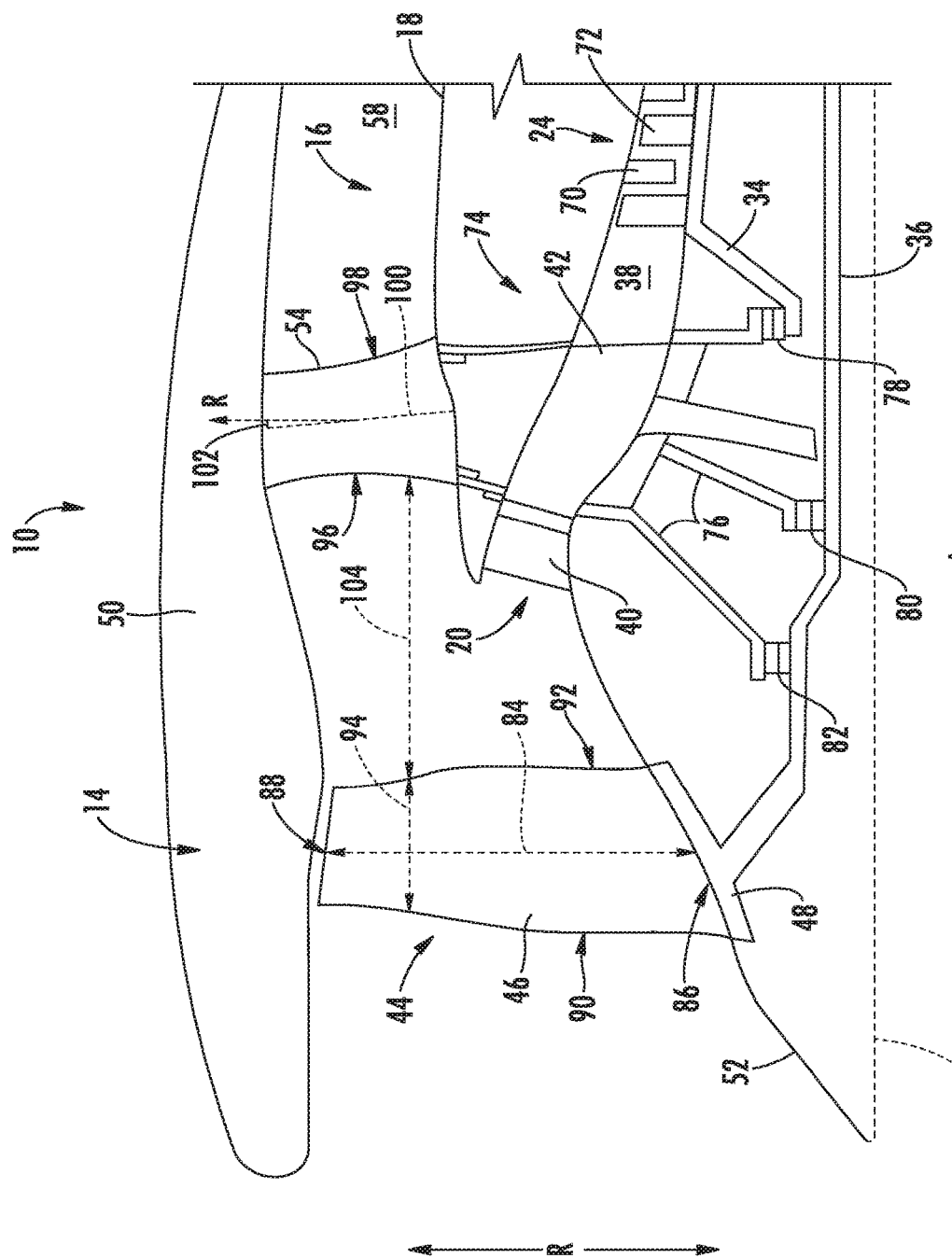
FIG. 2 is a close-up, schematic, cross-sectional view of a compressor section and the fan section of the exemplary gas turbine engine of FIG. 1.

Referring now to FIG. 2, a close-up, schematic view is provided of a portion of the compressor section (including the compressor 24) and fan section 14 of the exemplary turbofan engine 10 of FIG. 1. Similar to the HP turbine 28 and LP turbine 30, the HP compressor 24 includes a plurality of stationary HP compressor stator vanes 70 coupled to the outer casing 18 and a plurality rotatable HP compressor rotor blades 72 coupled to the HP shaft 34 for compressing an airflow provided through the inlet 20 of the core air flowpath 38 from the fan 44 of the fan section 14.

Moreover, as is depicted, rotation of the HP shaft 34 is supported at least in part through a forward frame 74 of the core turbine engine 16. The forward frame 74 provides support to a forward end of the core turbine engine 16, as well as to the HP shaft 34 and the LP shaft 36 (depicted extending coaxially with the HP shaft 34 to the fan 44).

Specifically, the forward frame 74 is attached to the struts 42 extending through the core air flowpath 38, which are, in turn, attached to the outlet guide vanes 54. Additionally, the forward frame 74 includes a plurality of inner frame members 76 located inside of the core air flowpath 38 along the radial direction R. It should be appreciated, however, that in other exemplary embodiments, the forward frame 74 may have any other suitable configuration.

More specifically, for the embodiment depicted, the forward frame 74 supports certain rotary components of the turbofan engine 10, e.g., the HP shaft 34 and the LP shaft 36, through one or more bearing assemblies. For example, the turbofan engine 10 depicted includes a first bearing 78 supporting a forward end of the HP shaft 34, a second bearing 80 supporting a forward end of the LP shaft 36, and a third bearing 82 supporting a portion of the LP shaft 36 extending to the fan 44. The first, second, and third bearings 78, 80, 82 may be configured in any suitable manner for supporting the various rotary components of the turbofan engine 10. For example, one or more of the first, second, and third bearings 78, 80, 82 may be configured as roller bearings, ball bearings, gas bearings, etc. Moreover, it should be appreciated that the exemplary forward frame 74 and bearing configuration depicted are also provided by way of example only, and that in other exemplary embodiments, the turbofan engine 10 may have any other suitable frame assembly and/or bearing configuration. For example, in other embodiments, the turbofan engine 10 may utilize any other suitable type or form of bearing.

Further, as discussed above, the fan section 14 of the turbofan engine 10 includes a single-stage fan 44 having a plurality of fan blades 46 extending generally along the radial direction R. Each of the plurality of fan blades 46 defines a span 84 along a length of the respective fan blade 46 (i.e., from a root 86 of the fan blade 46 to a tip 88 of the fan blade 46). For the embodiment depicted, the span 84 extends parallel to the radial direction R. More specifically, as used herein, the "span" of the fan blade 46 refers to a lengthwise measurement of the fan blade 46 extending from a width-wise centerpoint at its root 86 to a width-wise centerpoint at its tip 88 (as is depicted in FIG. 2).

Additionally, each fan blade 46 defines a leading edge 90 at an upstream end and a trailing edge 92 at a downstream end. Further, referring briefly now also to FIG. 3, a top side view of a fan blade 46 along the radial direction R is provided. As is shown, each fan blade 46 defines an axial width 94 from the leading edge 90 to the trailing edge 92 along the axial direction A. As will be appreciated, the axial width 94 may not be equal to a chord 95 of the fan blade 46 at a given location of the fan blade 46 due to a "twisting" of the fan blade 46. Accordingly, the chord 95 of the fan blade 46 may be much larger than the axial width 94 of the fan blade 46. It will also be appreciated that the axial width 94 along the axial direction A of each fan blade 46 may vary along the radial direction R, or more specifically, along the span 84 of the respective fan blade 46 (see FIG. 2).

Referring still to FIG. 2, and as discussed above, the nacelle 50 depicted is supported relative to the core turbine engine 16 by a plurality of circumferentially-spaced outlet guide vanes 54. Each of the plurality of outlet guide vanes 54 additionally defines a leading edge 96 and a trailing edge 98. Notably, each of the outlet guide vanes 54 for the embodiment depicted extends substantially along the radial direction R. Specifically, each of the outlet guide vanes 54 defines an axial centerline 100 (i.e., a line extending along a center of the outlet guide vane 54 from the casing 18 to the nacelle 50). The axial centerlines 100 of each of the outlet guide vanes 54 defines an angle 102 with of each of the outlet guide vanes 54 defines an angle 102 with the radial direction R less than about thirty degrees(30°), such as less than about twenty degrees(20°), such as less than about ten degrees(10°). Additionally, for the embodiment depicted, the outlet guide vanes 54 are forward-swept, such that they are tilted slightly forward (i.e., each outlet guide vane 54 extends towards the fan 44 as it extends outwardly generally along the radial direction R from the casing 18). For the embodiment depicted, each of the axial centerlines 100 are substantially straight. However, in other embodiments, wherein for example, the axial centerline 100 may be curved, the angle 102 may be defined with a line of best fit to the axial centerline 100, as determined using a least mean square estimate.

Furthermore, for the embodiment depicted, each of the plurality of outlet guide vanes 54 extend between the casing 18 of the core turbine engine 16 and the nacelle 50 at a location aft of, or downstream from, the inlet 20 to the core air flowpath 38. Additionally, each of the plurality of outlet guide vanes 54 defines an axial spacing 104 along the axial direction A from the trailing edges 92 of the plurality of fan blades 46 to the leading edges 96 of the plurality of outlet guide vanes 54.

As will be appreciated that, the turbofan engine 10 depicted is configured to reduce an acoustic disruption (i.e., a noise level) generated during operation of the turbofan engine 10 during supersonic flight speeds. More specifically, the exemplary turbofan engine 10 depicted is configured with a relatively high acoustic ratio AR to reduce an acoustic disruption generated during operation of the turbofan engine 10 during supersonic flight speeds. The acoustic ratio AR, as used herein, refers to a ratio of an axial spacing 104 along the axial direction A between the trailing edge 92 of the respective fan blade 46 and the leading edge 96 of the outlet guide vane 54 at a radial location seventy-five percent (75%) along the span 84 of the fan blade 46 to the axial width 94 of the fan blade 46 also at the radial location seventy-five percent (75%) along the span 84 of the respective fan blade 46.

For the embodiment depicted, the acoustic ratio AR of the turbofan engine 10 is greater than or equal to 2.3. For example, in certain exemplary embodiments, the acoustic ratio AR of the turbofan engine 10 may be greater than or equal to about 2.5, such as greater than or equal to about 2.75, such as greater than or equal to about 2.9. Notably, as used herein, terms of approximation, such as "about" or "approximately," refer to being within a five percent (5%) margin.

By way of example, in certain exemplary embodiments (see, e.g. FIG. 2), the axial width 94 of the fan blade 46 at the radial location seventy-five percent (75%) along the span 84 of the fan blade 46 may be at least about five (5) inches, such as at least about five and a half (5.5) inches, such as at least about 5.6 inches. As noted earlier, the chord 95 of the fan blade 46 will be greater than the axial width 94, and accordingly, the fan 44 may be referred to as a "wide chord" fan. Also by way of example, in certain exemplary embodiments, the axial spacing 104 along the axial direction A between the trailing edge 92 of the fan blade 46 and the leading edge 96 of the outlet guide vane 54 at the radial location seventy-five percent (75%) along the span 84 of the fan blade 46 may be at least about thirteen (13) inches, such as at least about fourteen (14) inches, such as at least about fifteen (15) inches, such as at least about sixteen (16) inches.

A turbofan engine having a fan and outlet guide vanes designed in accordance with one or more the exemplary embodiments of the present disclosure may allow for operation of the turbofan engine at supersonic flight speeds while minimizing an acoustic disturbance generated by the turbofan engine. Accordingly, a turbofan engine configured in accordance with one or more exemplary embodiments of the present disclosure may be more suitable for commercial applications and over-land flights.

Figure 4:
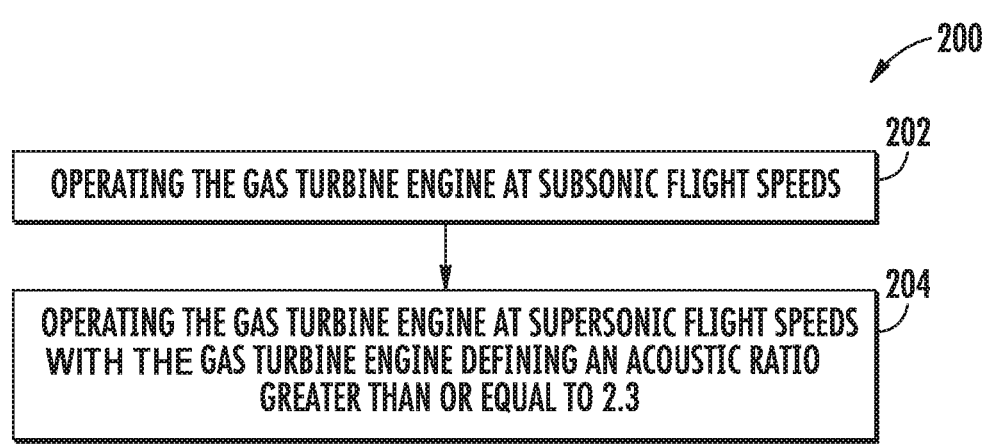
FIG. 4 is a flowchart of a method for operating a gas turbine engine in accordance with an exemplary aspect of the present disclosure.

Referring now to FIG. 4, a flow chart depicting a method (200) of operating a gas turbine engine is provided. The gas turbine engine may be configured in substantially the same manner as the turbofan engine described above with reference to FIGS. 1 and 2. Accordingly, the gas turbine engine may include a single-stage fan including a fan blade, a core turbine engine including a casing, a nacelle, and an outlet guide vane extending between the casing of the core turbine engine and the nacelle.

The exemplary method (200) includes at (202) operating the gas turbine engine at subsonic speeds, i.e., speeds less than Mach 1. Operating the gas turbine engine at subsonic speeds at (202) may include operating the gas turbine engine during takeoff operating modes, landing operating modes, and/or taxiing operating modes. In addition, the exemplary method (200) includes at (204) operating the gas turbine engine at supersonic flight speeds, i.e., speeds greater than Mach 1, with the gas turbine engine defining an acoustic ratio greater than or equal to 2.3 during such operations. Operating the gas turbine engine at supersonic flight speeds with the gas turbine engine defining an acoustic ratio greater than or equal to 2.3 at (204) may allow for operating the gas turbine engine at supersonic speeds while generating a reduced amount of acoustic disturbance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:
   a fan section comprising a single-stage fan having a fan blade, the fan blade defining a span, an axial width along the axial direction, and a trailing edge;
   a core turbine engine comprising a casing;
   a nacelle at least partially surrounding the fan of the fan section and the core turbine engine; and
   an outlet guide vane extending between the casing of the core turbine engine and the nacelle and defining a leading edge;
   wherein an acoustic ratio of the gas turbine engine is greater than or equal to 2.3, with the acoustic ratio being a ratio of an axial spacing between the trailing edge of the fan blade and the leading edge of the outlet guide vane at a radial location seventy-five percent (75%) along the span of the fan blade to the axial width of the fan blade also at the radial location seventy-five percent (75%) along the span of the fan blade.

2. The gas turbine engine of claim 1, wherein the acoustic ratio of the gas turbine engine is greater than or equal to 2.5.

3. The gas turbine engine of claim 1, wherein the acoustic ratio is greater than or equal to 2.75.

4. The gas turbine engine of claim 1, wherein the axial width of the fan blade at the radial location seventy-five percent (75%) along the span of the fan blade is at least about 5.5 inches.

5. The gas turbine engine of claim 1, wherein the axial spacing between the trailing edge of the fan blade and the leading edge of the outlet guide vane at the radial location seventy-five percent (75%) along the span of the fan blade is at least about fourteen (14) inches.

6. The gas turbine engine of claim 1, wherein the axial spacing between the trailing edge of the fan blade and the leading edge of the outlet guide vane at the radial location seventy-five percent (75%) along the span of the fan blade is at least about sixteen (16) inches.

7. The gas turbine engine of claim 1, wherein the core turbine engine defines a core air flowpath and an inlet to the core air flowpath, and wherein the outlet guide vane extends between the casing of the core turbine engine and the nacelle at a location aft of the inlet to the core air flowpath.

8. The gas turbine engine of claim 7, wherein the outlet guide vane extends substantially along the radial direction.

9. The gas turbine engine of claim 7, wherein the outlet guide vane defines a centerline, and wherein the centerline defines an angle with the radial direction less than thirty degrees (30°).

10. The gas turbine engine of claim 1, wherein the gas turbine engine is a direct drive gas turbine engine.

11. The gas turbine engine of claim 1, wherein the gas turbine engine is a supersonic turbofan engine configured to operate at flight speeds greater than Mach 1.

12. The gas turbine engine of claim 1, wherein the core turbine engine comprises a compressor section, and wherein the compressor section comprises a single compressor.

13. The gas turbine engine of claim 1, wherein the single stage fan defines a fan pressure ratio greater than 1.8.

14. A method of operating a gas turbine engine comprising a single-stage fan including a fan blade, a core turbine engine including a casing, a nacelle, and an outlet guide vane extending between the casing of the core turbine engine and the nacelle, the method comprising:
   operating the gas turbine engine at subsonic flight speeds; and
   operating the gas turbine engine at supersonic flight speeds with the gas turbine engine defining an acoustic ratio greater than or equal to 2.3, with the acoustic ratio being a ratio of an axial spacing between the trailing edge of the fan blade and the leading edge of the outlet guide vane at a radial location seventy-five percent (75%) along the span of the fan blade to the axial width of the fan blade also at the radial location seventy-five percent (75%) along the span of the fan blade.

15. The method of claim 14, wherein the acoustic ratio of the gas turbine engine is greater than or equal to 2.5.

16. The method of claim 14, wherein the acoustic ratio is greater than or equal to 2.75.

17. The method of claim 14, wherein the axial width of the fan blade at the radial location seventy-five percent (75%) along the span of the fan blade is at least about 5.5 inches.

18. The method of claim 14, wherein the axial spacing between the trailing edge of the fan blade and the leading edge of the outlet guide vane at the radial location seventy-five percent (75%) along the span of the fan blade is at least about fourteen (14) inches.

19. The method of claim 14, wherein the core turbine engine defines a core air flowpath and an inlet to the core air flowpath, and wherein the outlet guide vane extends between the casing of the core turbine engine and the nacelle at a location aft of the inlet to the core air flowpath.

20. A gas turbine engine defining an axial direction and a radial direction, the gas turbine engine comprising:
- a fan section comprising a single-stage fan having a fan blade, the fan blade defining a span, an axial width along the axial direction, and a trailing edge, wherein the single stage fan defines a fan pressure ratio greater than 1.8;
- a core turbine engine comprising a casing;
- a nacelle at least partially surrounding the fan of the fan section and the core turbine engine; and
- an outlet guide vane extending between the casing of the core turbine engine and the nacelle and defining a leading edge;
- wherein an acoustic ratio of the gas turbine engine is greater than or equal to 2.3, with the acoustic ratio being a ratio of an axial spacing between the trailing edge of the fan blade and the leading edge of the outlet guide vane at a radial location seventy-five percent (75%) along the span of the fan blade to the axial width of the fan blade also at the radial location seventy-five percent (75%) along the span of the fan blade,
- wherein the outlet guide vane is forward-swept, such that the outlet guide vane is tilted forward.

* * * * *